W. L. SMITH.
SNAP HOOK.
APPLICATION FILED MAY 17, 1916.
1,240,381.
Patented Sept. 18, 1917.
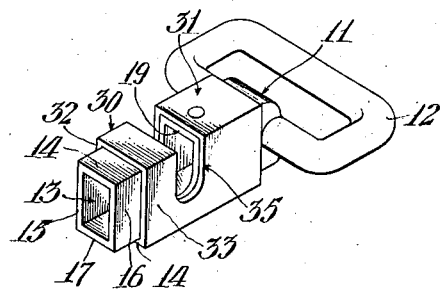
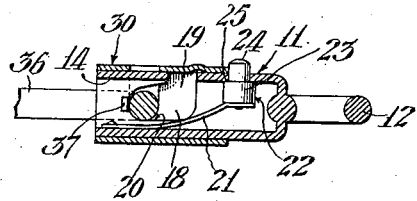
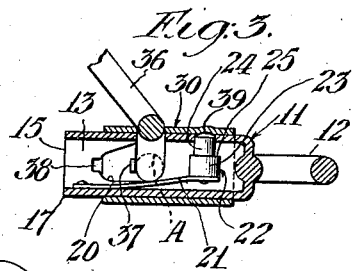
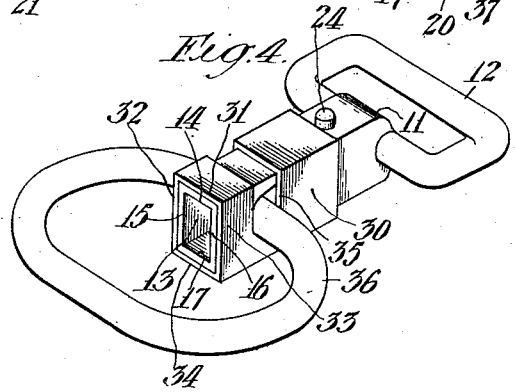
Inventor
Willard L. Smith
by Graham & Lawie
his Attorneys

UNITED STATES PATENT OFFICE.

WILLARD L. SMITH, OF LOS ANGELES, CALIFORNIA.

SNAP-HOOK.

1,240,381.  Specification of Letters Patent.  Patented Sept. 18, 1917.

Application filed May 17, 1916.  Serial No. 98,220.

*To all whom it may concern:*

Be it known that I, WILLARD L. SMITH, a citizen of the United States, residing at Los Angeles, in the county of Los Angeles and State of California, have invented a new and useful Snap-Hook, of which the following is a specification.

My invention relates to snap hooks, such as are used to secure rings in harness or other gear.

The principal object of my invention is to provide a snap hook which will combine great mechanical strength with mechanical simplicity and ease of operation.

In the drawings, which are for illustrative purposes only:

Figure 1 is a perspective view of my hook in the open position.

Fig. 2 is a section through the center of the hook shown in Fig. 1 with the parts in the locked position.

Fig. 3 is a section through the center of the hook shown in Fig. 1 with the parts in the open position.

Fig. 4 is a perspective view of the hook shown in Figs. 1, 2 and 3 in its closed position with a ring engaged therein.

In my invention, a body 11 is provided with an attachment buckle 12 to which a strap, rope, or other securing means may be secured, the attachment buckle 12 being merely a convenient method of securing one of the members which are to be fastened together to the body 11. The body 11 may be in section having a central opening 13 extending partly therethrough, this central opening being formed by a top 14, sides 15 and 16, and a bottom 17. Cut in the top 14 and in the sides 15 and 16 is an L-shaped slot 18, this slot having a vertical portion 19 at right angles to the top 14, and a horizontal portion 20 approximately parallel to the top 14. Secured to the bottom 17 is a flat spring 21, this flat spring pressing against the bottom of a pin 22, this pin consisting of an enlarged portion 23 and a smaller portion 24, these portions being joined by a shoulder 25. The spring tends to hold the shoulder 25 against the under side of the top 14 under normal conditions. Sliding on the body 11 is a sleeve 30, this sleeve being formed of a top 31, sides 32 and 33, and a bottom 34. Cut in the top 31, and in the sides 32 and 33, is a vertical slot 35, this slot being of about the same width as the vertical portion 19 of the L-shaped slot 18, and being so placed that it registers with this vertical portion when the snap hook is in the open position as shown in Fig. 1. With the parts as shown in this position, a ring 36 can be readily slipped into the slots 35 and the portion 19 of the L-shaped slot 18. Formed on the sleeve 30 are a pair of ears 37, these ears projecting into the slot 20, and entering small openings 38 in the extreme forward end thereof when the sleeve is in the closed position, as shown in Fig. 2, the ears serving to prevent the sleeve 30 from sliding off the body 11 when there is no ring 36 to be engaged. The sleeve 30 is made such a length and the pin 22 is so located that the small end 24 of the pin 22 is forced upwardly by the spring 21 into the position shown in Fig. 4 when the snap hook is in the closed position, thereby effectually locking the sleeve 30 in that position. The sleeve 30 is provided with a small indentation 39 so placed that the small end 24 of the pin 22 fits therein when the snap hook is in the open position.

The method of operation is as follows:

The hook being in the open position as shown in Fig. 1, and being frictionally restrained in this position by the end of the pin 22 fitting into the depression 39, as shown in Fig. 3, the ring 36, or any other fastening device which it is desired to secure, is slipped into the slot 35 and into the vertical portion 19 of the L-shaped slot 18, being dropped into the position shown in dotted lines at "A" in Fig. 3. By pulling on the ring 36, or by pushing with the thumb on the sleeve 35, the sleeve is slid forward into the closed position as shown in Figs. 2 and 4, the small ears 37 fitting into the openings 38 as shown in Fig. 2. When the parts reach the position shown in Fig. 4, the pin 22 is forced upwardly by the spring 21 assuming the position shown in Figs. 2 and 4, and serving to lock the sleeve 30 in its forward position. In this position the ring is firmly engaged and cannot be readily disengaged, except by pressing down on the end 24 of the pin 22, in which case it is easy to slide the sleeve 30 back and remove the ring 36.

I claim as my invention:—

1. A snap hook comprising a body having an L-shaped slot therein, the primary branch of the L-shaped slot being at right angles to the top of the body and the secondary branch of the L-shaped slot being parallel with the top of the body; an attachment eye secured to said body; a sleeve sliding on said body, said sleeve having a straight slot therein which coincides with the primary branch of the L-shaped slot in said body when said sleeve is slid to the open position; ears formed on said sleeve, said ears projecting inwardly from said sleeve into the secondary branch of said L-shaped slot; and means for locking said sleeve in the locked position on said body, the lower end of said slot in said sleeve coinciding with the extreme end of said secondary slot when said sleeve is in the locked position.

2. A snap hook comprising a body having an L-shaped slot therein, the primary branch of the L-shaped slot being at right angles to the top of the body and the secondary branch of the L-shaped slot being parallel with the top of the body; an attachment eye secured to said body; a sleeve sliding on said body, said sleeve having a straight slot therein which coincides with the primary branch of the L-shaped slot in said body when said sleeve is slid to the open position; ears formed on said sleeve, said ears projecting inwardly from said sleeve into the secondary branch of said L-shaped slot; and a spring operated pin secured to slide in said body and engaging said sleeve in such a manner as to lock said sleeve in the locked position on said body, the lower end of said slot in said sleeve coinciding with the extreme end of said secondary slot when said sleeve is in the locked position.

3. A snap hook comprising a body having an L-shaped slot therein, the primary branch of the L-shaped slot being at right angles to the top of the body and the secondary branch of the L-shaped slot being parallel with the top of the body; an attachment eye secured to said body; a sleeve sliding on said body, said sleeve having a straight slot therein which coincides with the primary branch of the L-shaped slot in said body when said sleeve is slid to the open position; ears formed on said sleeve, said ears projecting inwardly from said sleeve into the secondary branch of said L-shaped slot; a pin sliding in said body, and a spring tending to hold said pin in its upper position, said sleeve being of such a length that it is engaged by said pin and prevented from sliding on said body when said sleeve is in its locked position, said slot in said sleeve coinciding with the extreme end of said secondary slot in said body when said sleeve is in the locked position.

4. A snap hook comprising a body having an L-shaped slot therein, the primary branch of the L-shaped slot being at right angles to the top of the body and the secondary branch of the L-shaped slot being parallel with the top of the body; an attachment eye secured to said body; a sleeve sliding on said body, said sleeve having a straight slot therein which coincides with the primary branch of the L-shaped slot in said body when said sleeve is slid to the open position; ears formed on said sleeve, said ears projecting inwardly from said sleeve into the secondary branch of said L-shaped slot; a pin sliding in said body, and a spring secured in said body and forcing said pin into its upper position, said sleeve being of such a length that it is engaged by said pin and prevented from sliding on said body when said sleeve is in its locked position, said slot in said sleeve coinciding with the extreme end of said secondary slot in said body when said sleeve is in the locked position.

In testimony whereof, I have hereunto set my hand at Los Angeles, California, this 11th day of May, 1916.

WILLARD L. SMITH.

Copies of this patent may be obtained for five cents each, by addressing the "Commissioner of Patents, Washington, D. C."